United States Patent
Xue et al.

(10) Patent No.: US 10,009,213 B2
(45) Date of Patent: Jun. 26, 2018

(54) SYSTEM AND METHOD FOR ISOLATION OF MULTI-TENANT PLATFORM CUSTOMIZATION USING CHILD PROCESSES

(71) Applicant: NetSuite Inc., San Mateo, CA (US)

(72) Inventors: Wei (Michelle) Xue, Redwood City, CA (US); Geoffrey Morrison, Mountain View, CA (US)

(73) Assignee: NETSUITE INC., San Mateo, CA (US)

( * ) Notice: Subject to any disclaimer, the term of this patent is extended or adjusted under 35 U.S.C. 154(b) by 379 days.

(21) Appl. No.: 14/675,994

(22) Filed: Apr. 1, 2015

(65) Prior Publication Data

US 2017/0237682 A1  Aug. 17, 2017

Related U.S. Application Data

(60) Provisional application No. 61/989,292, filed on May 6, 2014.

(51) Int. Cl.
*G06F 15/173* (2006.01)
*H04L 29/06* (2006.01)
*G06F 9/50* (2006.01)

(52) U.S. Cl.
CPC ............... *H04L 29/06* (2013.01); *G06F 9/50* (2013.01)

(58) Field of Classification Search
CPC .............................. H04L 47/72; H04L 43/16
See application file for complete search history.

(56) References Cited

PUBLICATIONS

Lett et at, Proceeding AFIPS '68 (Fall, part I) Proceedings of the Dec. 9-11, 1968, fall joint computer conference, part I, pp. 15-28.*
Wai-kai Chen, "The Electrical Engineering Handbook", 2005, Elsevier Academic Press, p. 356.*
D.A. Anderson, "Operating Systems", Jun. 1981, Tutorial Series 9.*

* cited by examiner

*Primary Examiner* — Ryan Jakovac
(74) *Attorney, Agent, or Firm* — Cooper Legal Group LLC

(57) ABSTRACT

A system and method for addressing the impact of tenant/user customizations on various operations in a multi-tenant computing platform. In one embodiment, the system uses an operating system process (e.g., a parent process) to handle incoming operation requests to the platform from one or more tenants. If an incoming request specifies that a user customization should be executed, then the parent process coordinates execution of a separate operating system process (e.g., a child process) to execute the customization operation and return the result of the child process execution. In this manner, a single parent process may create several child processes to execute different customizations that each may be monitored and managed separately for resource use and consumption.

20 Claims, 5 Drawing Sheets

SYSTEM AND METHOD FOR ISOLATION OF MULTI-TENANT PLATFORM CUSTOMIZATION USING CHILD PROCESSES

PRIORITY CLAIM

This application claims the benefit of U.S. Provisional Application No. 61/989,292, entitled "System and Method for Isolation of Multi-Tenant Platform Customization Using Child Processes," filed May 26, 2014, which is incorporated by reference in its entirety herein for all purposes.

BACKGROUND

A distributed computing service/platform may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information. A multi-tenant data processing platform typically executes data processing operations on behalf of many tenants/customers using a fixed set of computing resources. Such a platform generally does this by executing operations on separate threads of execution within a single operating system process. In order to ensure a consistent quality of service for the tenants, the platform may need to restrict the ability of one operation to consume excessive resources to the detriment of other operations that are executing at the same time (where the resources in question are primarily processing (CPU) time and memory (RAM)).

However, certain tenants may wish to be able to customize their data processing operations to better meet their business needs. These customizations are intended to interact tightly with the functionality provided by the platform. However, as the complexity and flexibility of the customization processes increases, the ability of the platform operator to restrict the resource utilization of the data processing operations decreases. Conventional approaches to addressing the impact of tenant/customer customizations to data processing operations on the resource allocation and operation of a multi-tenant platform fail to effectively solve the problems presented while maintaining the benefits of a multi-tenant platform. Embodiments are directed toward solving these and other problems individually and collectively.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

Note that the same numbers are used throughout the disclosure and figures to reference like components and features.

DETAILED DESCRIPTION

Figure 1:
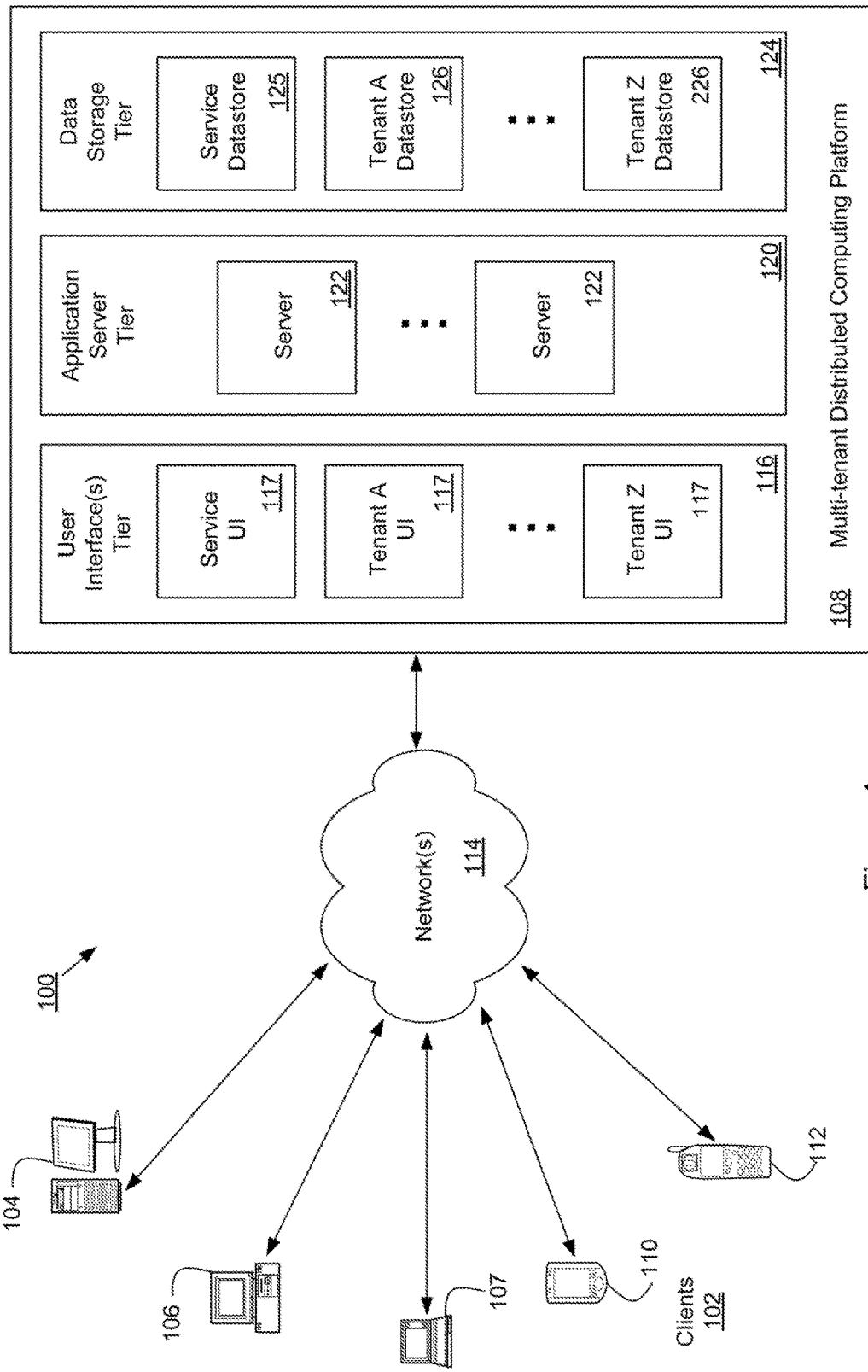
FIG. 1 is a diagram illustrating elements or components of an example operating environment in which an embodiment of the subject matter disclosed herein may be implemented.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, the present subject matter may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In some embodiments, the subject matter may be implemented in the context of a multi-tenant, "cloud" based environment (such as a multi-tenant business data processing platform), typically used to develop and provide web services and business applications for end users. This exemplary implementation environment will be described with reference to FIGS. 1-4 below. Note that embodiments may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

As discussed in the background, in order to ensure a consistent quality of service for the tenants, a multi-tenant, distributed, computing platform (hereinafter, platform) may need to restrict the ability of one operation to consume excessive resources to the detriment of other operations that are executing at the same time (where the resources in question are primarily processing (CPU) time and memory (RAM)). One possible approach to this problem is to begin a timer upon when a data processing operation begins and to SIMPLY terminate the operation if and when the timer expires. While this would prevent excessive use of resources, the approach has multiple drawbacks: it does not restrict access to RAM; it penalizes operations (e.g., scripts) that spend time waiting for an external result to be returned (during which time they are not utilizing any CPU time); and terminating the operation of a single operation in a multi-threaded application requires the system to be built with termination in mind (which is difficult for the platform and not enforceable for any customized operations that may run on top of the platform if the platform is flexible).

Another possible approach is to run a separate instance of the platform for each tenant/customer, wherein each instance includes process-wide resource limits set to prevent interference with other instances that may be executing using the same computing resources. This makes each instance substantially equivalent to a single-tenant platform, thereby negating many of the benefits of multi-tenant platforms, including reduced hardware and management overhead. These solutions have drawbacks as are evident in the discussion below with regard to embodiments of the subject disclosed next and in particular with regard to tenants/customer who may wish to customize operations to meet specific needs.

By way of overview, the subject matter disclosed herein is directed to systems, apparatuses, and methods for addressing the impact of tenant/user customizations on various operations in a multi-tenant computing platform, specifically with regards to the allocation of computing-related resources for other users. In one embodiment, the system uses an operating system process (e.g., a parent process) to handle incoming operation requests (simply requests, hereinafter) to the platform from one or more tenants. If an incoming request specifies that a user customization should be executed, then the parent process coordinates execution of a separate operating system process (e.g., a child process) to execute the customization operation and return the result of the child process execution. In this manner, a single parent process may create several child processes to execute different customizations that each may be monitored and managed separately for resource use and consumption. The parent process may maintain a pool of child processes that are available to process customizations, or it may create a new child process when an execution is requested. After an execution completes, the parent process may terminate the child process or may leave the child process in an idle state so it can process future executions.

In one embodiment, a single child process executes a single user customization at a time. This prevents one user customization from interfering with another customization in the same process. Multiple child processes are isolated from one another by the operating system process model, which prevents processes from accessing data stored in other processes and provides equitable allocation of shared system resources.

The operating system enforces resource limits on individual child processes, for example, by limiting the amount of memory a process may acquire and/or limiting the amount of CPU time that a process can consume. The operating system also runs the child processes with different priorities, so e.g., processes running customizations from higher-value customers may be able to acquire relatively more resources than those running customizations from lower-value customers, or customizations with stricter requirements on execution time may be run with a higher CPU time allocation than customizations that can take longer to execute without business impact. When a child process exceeds its resource limits, the child process can be terminated (by the operating system or by the parent process) or it can be allowed to continue executing with a lower priority.

In some cases, a child process may communicate with its parent process, e.g., to request additional data that is required by the user customization. This communication may take place over one or more of several possible communication channels, including the standard input/output streams of the child process, other file descriptors shared between the parent and child processes, Unix-domain or TCP/IP sockets, or HTTP communications, for example. The messages exchanged over the channel or channels may use one of several formats, including serialized binary objects, key-value pairs, XML documents, or JavaScript Object Notation (JSON) values.

The communication channel and message format are independent of the technology used to implement the user customizations. This allows multiple technologies to be utilized in the same platform and new technologies to be added. For example, user customizations may be written in the JavaScript, Java, or Python programming languages without changes to the channel or format.

Other objects and advantages of the present subject matter will be apparent to one of ordinary skill in the art upon review of the detailed description of the specification and the included figures.

FIG. 1 is a diagram illustrating elements or components of an example operating environment in which an embodiment may be implemented. In FIG. 1, an example operating environment 100 includes a variety of clients 102 incorporating and/or incorporated into a variety of computing devices that may communicate with a distributed computing service/platform 108 through one or more networks 114. For example, a client may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing service/platform (which may also be referred to as a multi-tenant business-data-processing platform) 108 may include multiple processing tiers, including a user interface tier 116, an application server tier 120, and a data storage tier 124. The user interface tier 116 may maintain multiple user interfaces 117, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, and the like. Each processing tier shown in FIG. 1 may be implemented with a set of computers and/or computer components including computer servers and processors, and may perform various functions, methods, processes, or operations as determined by the execution of a software application or set of instructions. The data storage tier 124 may include one or more data stores, which may include a service data store 125 and one or more tenant data stores 126.

Each tenant data store 126 may contain tenant-specific data that is used as part of providing a range of tenant-specific business services or functions, including but not limited to ERP, CRM, eCommerce, Human Resources management, payroll, and the like. Data stores may be implemented with any suitable data storage technology, including structured query language (SQL) based relational database management systems (RDBMS).

In accordance with one embodiment, the distributed computing service/platform 208 may be a multi-tenant and service platform 108 and may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an ERP system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 122 that are part of the platform's Application Server Tier 120.

Another business information system that may be provided as part of an integrated data processing and service platform is an integrated CRM system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 108 of FIG. 1) may also include one or more of an integrated partner and vendor management system, eCommerce system (e.g., a virtual storefront application or platform), product lifecycle management (PLM) system, Human Resources management system (which may include medical/dental insurance administration, payroll, and the like), or supply chain management (SCM) system. Such functions or business applications are typically implemented by one or more modules of software code/instructions that are maintained on and executed by one or more servers 122 that are part of the platform's Application Server Tier 120.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

The integrated business system shown in FIG. 1 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, and the like. A web server is a most often a combination of hardware and the software that helps deliver content (typically by hosting a website) to client web browsers that access the web server via the Internet.

Rather than build and maintain such an integrated business system themselves, a business may utilize systems provided by a third party. Such a third party may implement an integrated business system as described above in the context of a multi-tenant platform, wherein individual instantiations of a single comprehensive integrated business system are provided to a variety of tenants. However, one challenge in such multi-tenant platforms is the ability for each tenant to tailor their instantiation of the integrated business system to their specific business needs. In one embodiment, this limitation may be addressed by abstracting the modifications away from the codebase and instead supporting such increased functionality through custom transactions as part of the application itself. Prior to discussing additional aspects of custom transactions, additional aspects of the various computing systems and platforms are discussed next with respect to FIG. 2.

Figure 2:
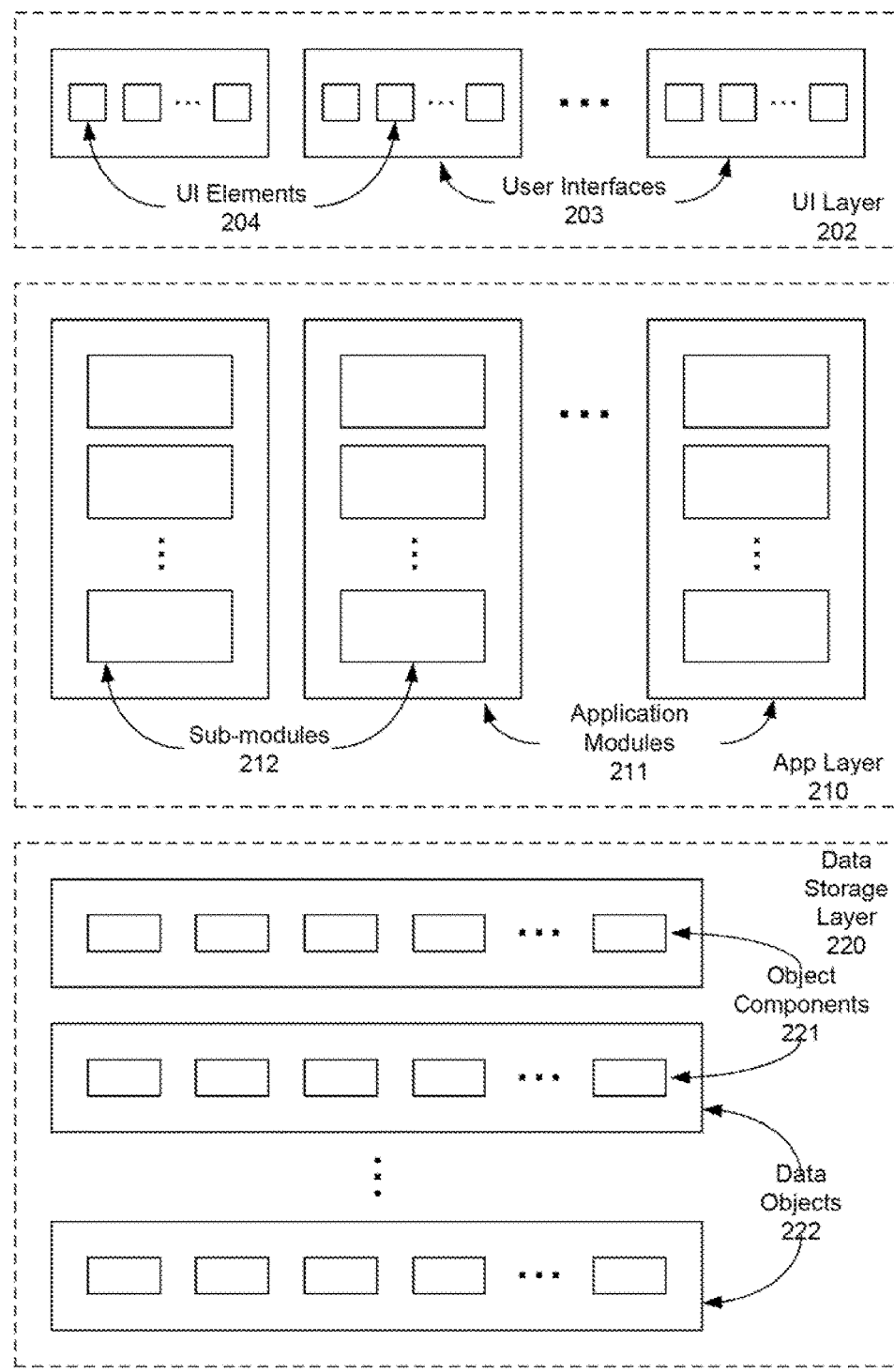
FIG. 2 is a diagram illustrating additional details of the elements or components of the multi-tenant distributed computing service platform of FIG. 1, in which an embodiment of the subject matter disclosed herein may be implemented.

FIG. 2 is a diagram illustrating additional details of the elements or components of the distributed computing service platform of FIG. 1, in which an embodiment may be implemented. The software architecture depicted in FIG. 2 represents an example of a complex software system to which an embodiment may be applied. In general, an embodiment may be applied to any set of software instructions embodied in one or more non-transitory, computer-readable media that are designed to be executed by a suitably programmed processing element (such as a CPU, microprocessor, processor, controller, computing device, and the like). In a complex system such instructions are typically arranged into "modules" with each such module performing a specific task, process, function, or operation. The entire set of modules may be controlled or coordinated in their operation by an operating system (OS) or other form of organizational platform.

In FIG. 2, various elements or components 200 of the multi-tenant distributed computing service platform of FIG. 1 are shown, in which an embodiment may be implemented. The example architecture includes a user interface layer or tier 202 having one or more user interfaces 203. Examples of such user interfaces include graphical user interfaces and application programming interfaces (APIs). Each user interface may include one or more interface elements 204. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 210 may include one or more application modules 211, each having one or more sub-modules 212. Each application module 211 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

receiving and processing an incoming request using a
  parent process;

initiating one or more child processes with each child process corresponding to a customization of the parent process desired by the requestor;

executing the one or more child processes and receiving the result of executing the child processes; and Using the results of executing the one or more child processes in responding to the request.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 122 of FIG. 2) may include each application module. Alternatively, different application servers may include different sets of application modules. Such sets may be disjoint or overlapping.

The data storage layer 220 may include one or more data objects 222 each having one or more data object components 221, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Figure 3:
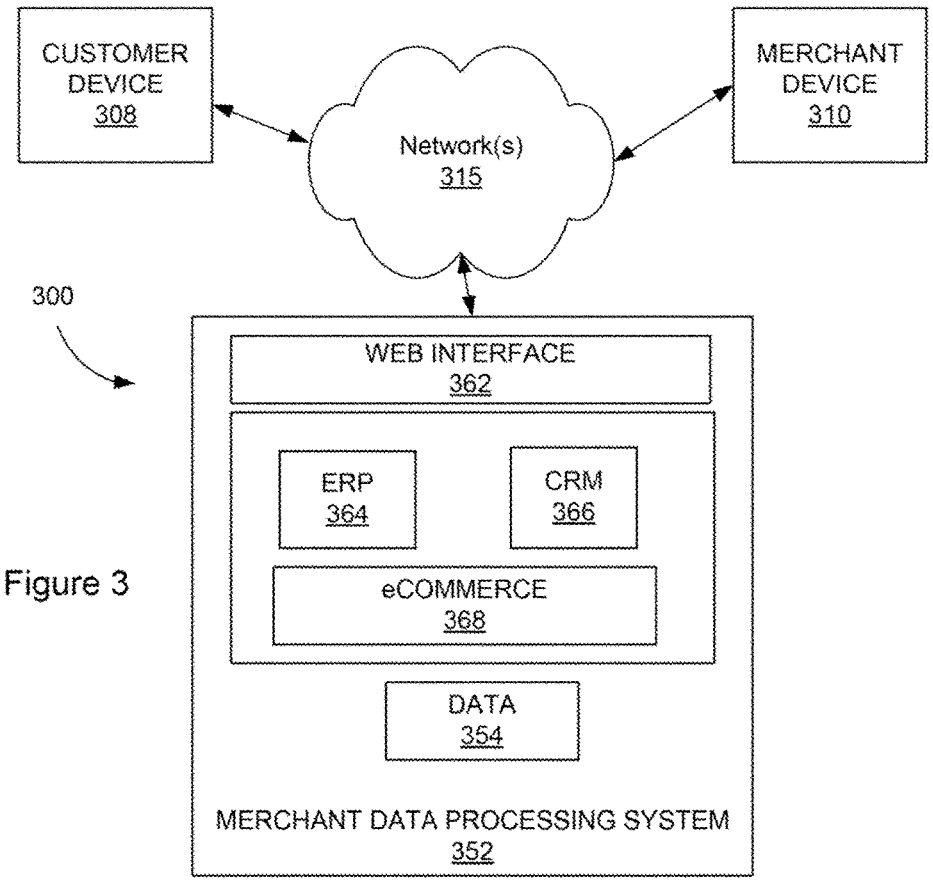
FIG. 3 is a diagram illustrating a simplified system of FIG. 1, including an integrated business system and an enterprise network in which an embodiment of the subject matter disclosed herein may be implemented.

FIG. 3 is a diagram illustrating another perspective of a computing or data processing environment 300 in which an embodiment may be implemented. FIG. 3 illustrates a merchant's data processing system 352, where such a platform or system may be provided to and operated for the merchant by the administrator of a multi-tenant business data processing platform. Thus, the merchant may be a tenant of such a multi-tenant platform, with the elements that are part of system 352 being representative of the elements in the data processing systems available to other tenants. The merchant's data is stored in a data store 354, thereby permitting customers and employees to have access to business data and information via a suitable communication network or networks 315 (e.g., the Internet). Data store 354 may be a secure partition of a larger data store that is shared by other tenants of the overall platform.

A user of the merchant's system 352 may access data, information, and applications (i.e., business related functionality) using a suitable device or apparatus, examples of which include a customer computing device 308 and/or the Merchant's computing device 310. In one embodiment, each such device 308 and 310 may include a client application such as a browser that enables a user of the device to generate requests for information or services that are provided by system 352. System 352 may include a web interface 362 that receives requests from users and enables a user to interact with one or more types of data and applications (such as ERP 364, CRM 366, eCommerce 368, or other applications that provide services and functionality to customers or business employees).

Note that the example computing environments depicted in FIGS. 1-3 are not intended to be limiting examples. Alternatively, or in addition, computing environments in which embodiments may be implemented include any suitable system that permits users to access, process, and utilize data stored in a data storage element (e.g., a database) that can be accessed remotely over a network. Although further examples below may reference the example computing environment depicted in FIGS. 1-3, it will be apparent to one of skill in the art that the examples may be adapted for alternate computing devices, systems, and environments.

Figure 4:
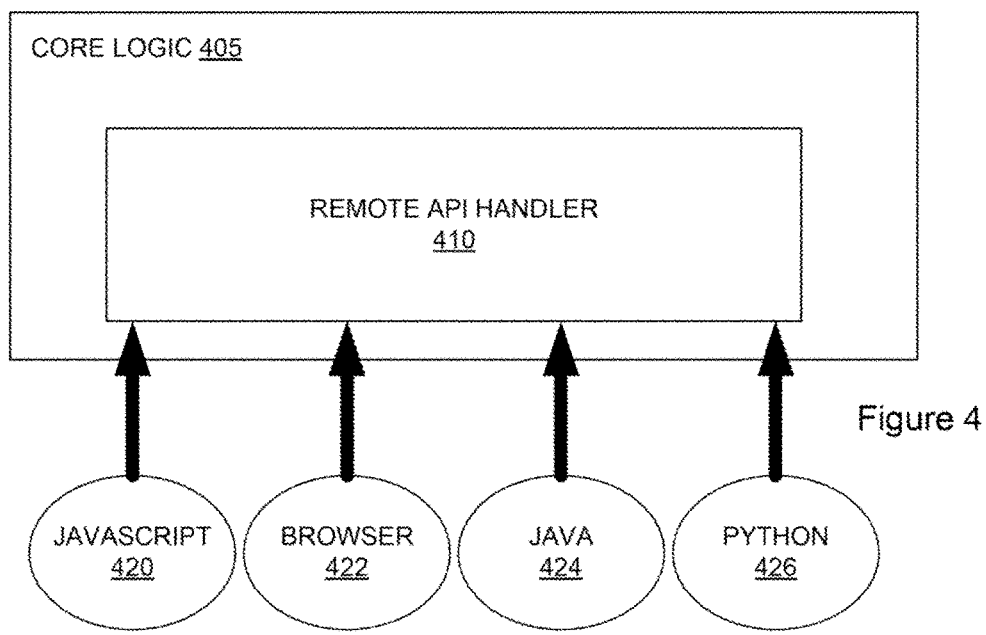
FIG. 4 is a diagram illustrating aspects of an element for interfacing between a user customization and a multi-tenant data processing platform that may be used when implementing an embodiment of the subject matter disclosed herein.

FIG. 4 is a diagram illustrating aspects of an element for interfacing between a user customization and a multi-tenant data processing platform that may be used when implementing an embodiment. In FIG. 4, a generic remote Application Programming Interface (API) handler 410 for providing an interface between various processes written in a user script and the platform core logic 405 (i.e., the CRM functionality or ERP functionality). In the example user scripts shown "interfacing" with the remote API handler 410, four specific kinds of user script processes are shown: a JavaScript process 420, a Java process 422, a generic browser process 424, and a Python script process 426. In this manner, various embodiments can be extended to support new languages (not shown) and environments for the user.

Figure 5:
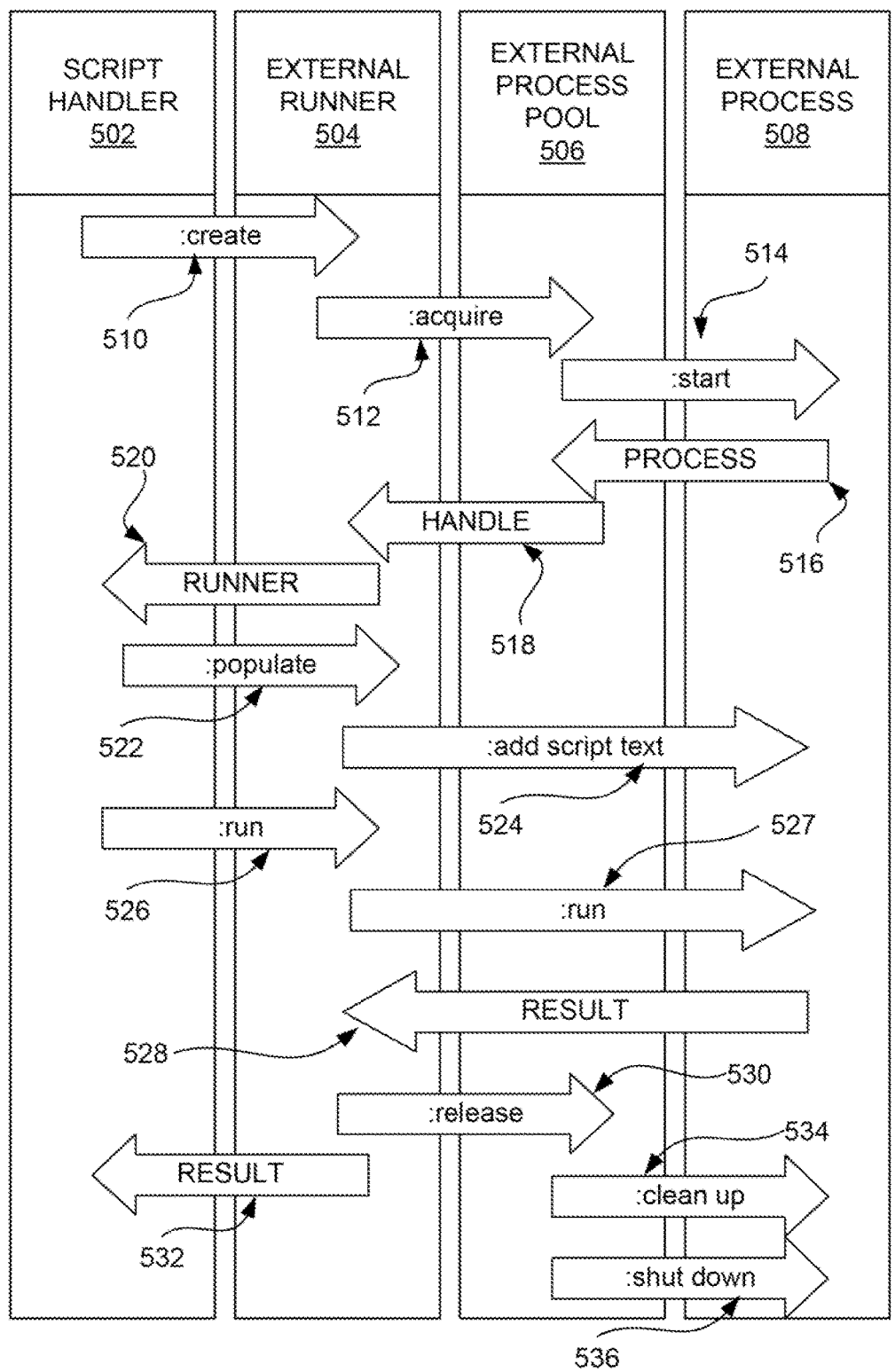
FIG. 5 is a illustrating the data flow for a process, method, operation, or function for executing a user customization that may be used when implementing an embodiment of the subject matter disclosed herein.

A typical embodiment may execute a JavaScript process 420, but the environment can be extended to run other languages, since the server side endpoint is generic. Thus, the remote API handler 410 may analyze any operation requests from one or more users and direct each operation request to be handled by an existing parent process, a new parent process, an existing child process or a new child process, all while allocating system resources according to pre-established parameters for each kind of process. FIG. 5 is an example flowchart of a method whereby a system as described above may handle various operation requests from users.

Turning attention to FIG. 5, this figure illustrates is a flow diagram of a process, method, operation, or function for executing a user customization that may be used when implementing an embodiment. The diagram indicates the sequence of interactions between components that occurs on the platform when a user customization is to be executed. Each column represents a component of the remote API handler 410 of FIG. 4. The three left-most columns represent components internal to the platform: Script Handler 502 is a component responsible for accepting requests to execute customizations; External Script Runner 504 is a component that is responsible for executing customizations in external processes; and an External Process Pool 506 is responsible for managing and maintaining the pool of child processes. The fourth column, External process 508, represents the child process itself. Labels that begin with a colon (":create", ":run") indicate operation requests being sent between components; labels that contain capitalized words ("Process", "Result") indicate values being sent between components.

When the Script Handler 502 receives a user operation request, the operation may be determined here to be best served through a child process. Thus, the Script Handler 502 creates (through the :create step 510. This invokes the External Script Runner 504 to initiate an :acquire step 512 for determining a specific child process to be invoked. In one embodiment, the child process may be a new child process with specific parameters for system usage. In another embodiment, the child process may be an existing and currently executing child process whereby allocated system resource parameters are shared between assigned operations to said child process. In yet another embodiment, the child process may be an already created child process that is dormant due to a recently finalized operation request that was assigned to it. Once assigned (e.g., acquired), a :start step 514 may be invoked whereby the user operation request utilizes the assigned child process at the External Process Handler 508.

Once the specific child process is assigned/initiated, the External Process Handler 508 returns a PROCESS request 516 with specific parameters that are set for the specific child process. As discussed above, these parameters may be limitations on resource usage such as CPU cycles for consumption, CPU time for consumption, RAM memory available, and the like. The External Process Pool 506 receives the PROCESS 516 parameters and establishes a HANDLE protocol 518 for monitoring said parameters and the External Runner 504 notifies the Script Handler 502 that the child process is ready to begin execution of the script via a RUNNER command 520.

As the script begins, the Script Handler 502 :populates 522 the child process with the script as it is received. The External Runner 504 :adds the script text 524 itself to the child process for execution and handling at the External Process Handler 508. The external process Handler 508 compiles the scripts, sets the governance limits, and runs the compiled scripts. When the script is loaded and ready, the Script Handler 502 initiates execution of the script via the child process through a :run command 526. The External Runner 504 relays a :run command 527 to the child process for execution and handling at the External Process Handler 508.

As the script is being run at via the External Process Handler 508, the External Process Pool 506 continues to monitor the usage of system resources against the parameters established for the child process. If the child process can execute fully within the assigned parameters of the child process, a RESULT 528 is sent to the External Runner 504. The External Runner 504 may then forward a RESULT 532 to the Script Handler 502. At the same time, the External Runner 504 initiates :release command 530 to the External Process Pool 506 so as to release the child process. The External Process Pool 506 initiates a :clean up command 534 so as the delete specific script from the child process. Further, the External Process Pool 506 may also initiate a :shut down command 536 if the child process is to not be used in subsequent operation requests.

Alternatively, if the External Process Pool 506 that is monitoring the usage of system resources against the parameters established for the child process determines that the child process has exceeded a threshold for one of the parameters, the External Runner 504 may initiate the :release command 530 to the External Process Pool 506 so as to release the child process without ever reaching a RESULT 528. The External Process Pool 506 may still initiate the :clean up command 534 so as the delete specific script from the child process. Further, the External Process Pool 506 may also initiate the :shut down command 536 if the child process is to not be used in subsequent operation requests. In a further alternative embodiment, the External Process Pool 506 may shift parameters upon detection of exceeding a threshold of an initial parameter. For example, once a CPU limit is reached, the method may allow the script continue to use CPU time, but at a reduced or limited rate.

Such a handling of child process provides an isolated environment to run script/logic that is designed specifically for needs of a custom user. Users can tightly interact with core logic to define business flow according to tailored needs without impacting other users of the multi-tenant platform.

In terms of a JavaScript example, the systems and methods discussed herein allows script of a user to run in a different JVM environment (different memory, process, and the like) from the core logic, while still maintaining the same functionalities. Not only is user script isolated from the core logic, the specific user script is isolated from other scripts from other users. So a malicious script or badly written script will not affect the performance of the overall core logic or other users' script.

Such parameter controlled environments also provide ability for the multi-tenant platform to establish governance of users' scripts. Such governances (e.g., limitations, thresholds, etc.) include memory limit and CPU limit at a course level and very fine grain levels such as heap size, stack size and CPU time. This fine grain control (or at least the ability to implement such a level of control) can be used to provide different business models for users of the platform, such as making certain levels of resources available to specific users for specific tasks in return for generating additional revenue.

In one embodiment, scripts in the External Process Handler 508 may use a client scripting library that is not associated with any server-side scripting library. The client scripting library may be used in conjunction with the remote API handler with JavaScript objects retrieved from the server as JSON or XML, as opposed to a server-side library, which uses Java objects. Further, the external process handler 508 communicates with core logic over the process's standard input and output streams. This allows API calls to be associated with the correct script context and also provides performance benefits over using HTTP to make API calls.

In an embodiment, script runner processes may be launched speculatively (preforked) and pooled to avoid exposing startup latency to the script. In this manner, each script runner executes a fixed number of scripts before terminating and being replaced in the pool. Thus, each process executes only one script at a time in this embodiment. The pool maintains a limit on the number of scripts that can be running at a time; if that limit is reached, requests for a script runner will block until a process becomes available. This prevents resource exhaustion on the host.

Figure 6:
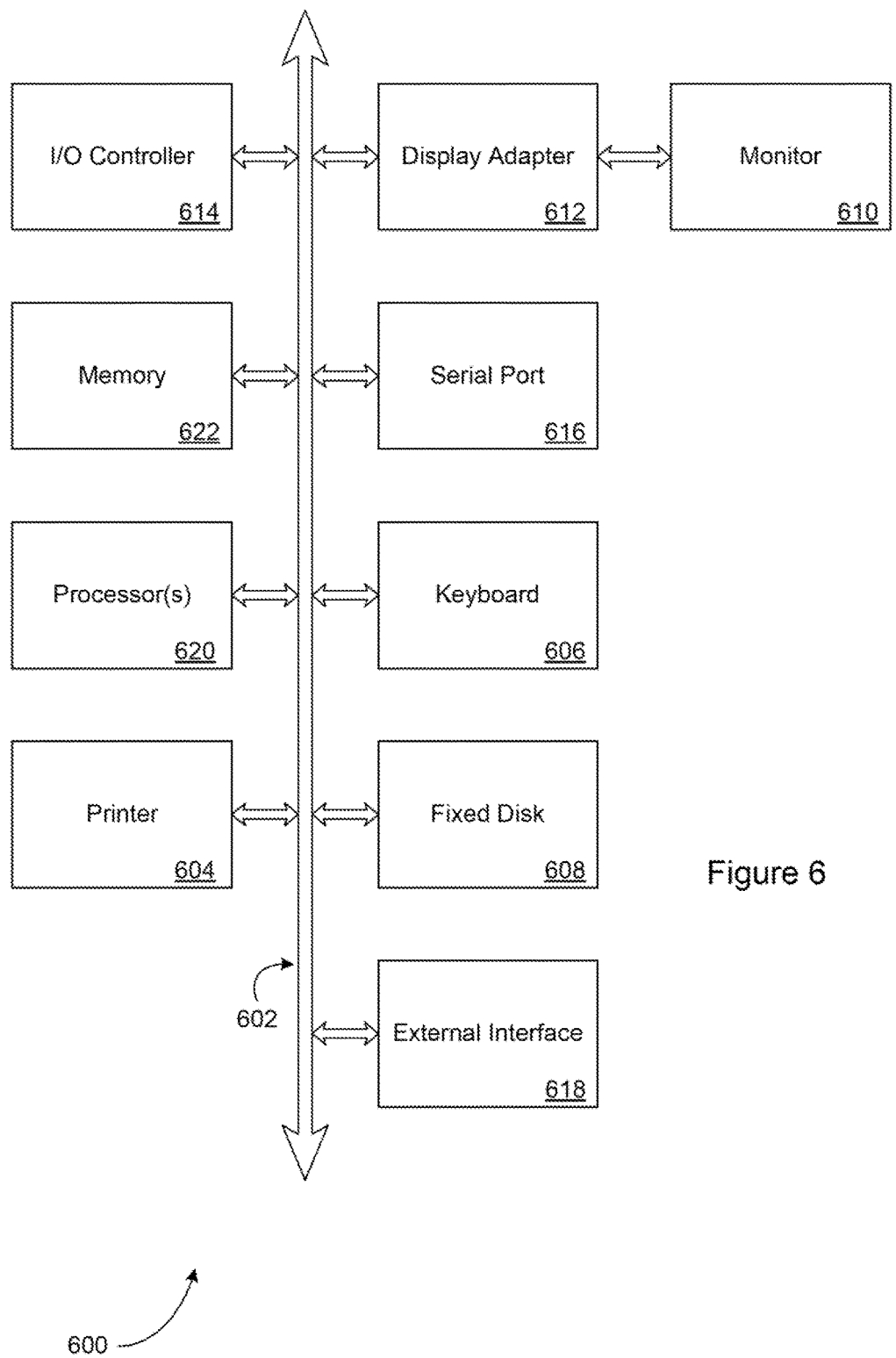
FIG. 6 is a diagram illustrating elements or components that may be present in a computer device or system configured to implement a method, process, function, or operation in accordance with an embodiment of the subject matter disclosed herein.

In accordance with one embodiment, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present subject matter as described above can be implemented in the form of control logic using computer software in a modular or integrated manner. Based on the disclosure and teachings provided herein, a person of ordinary skill in the art will know and appreciate other ways and/or methods to implement the present embodiments using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. A computer-implemented method for a multi-tenant computing system, comprising:
   receiving, using a parent process, a request at a multi-tenant platform to perform an operation on behalf of a tenant of the multi-tenant platform that impacts at least one resource of the multi-tenant platform; and
   responsive to analyzing the request to determine a customization associated with the operation associated with the tenant, initiating a child process for the tenant to perform the customization at the multi-tenant platform;
   isolating the child process from other processes associated with other tenants of the multi-tenant platform, wherein the isolating comprises defining a first environment, for the child process, that is isolated from (i) a second environment of a core logic of the multi-tenant platform and (ii) environments of customizations for the other tenants, wherein each environment is associated with same functionalities and different memory;
   assigning at least one limitation on usage of the at least one resource by the child process;
   controlling execution of the child process, in the first environment, based on the limitation on usage of the resource, wherein the controlling the execution comprises (i) restricting the child process from accessing at least some data of the second environment and from accessing at least some data of the environments of customizations for the other tenants and (ii) restricting the child process from consuming more than a threshold of the resource defined by the limitation;
   monitoring use of the at least one resource by the child process; and
   responsive to determining that the monitored use exceeds the threshold, assigning a further limitation on usage of the resource by the child process.

2. The computer-implemented method of claim 1 wherein the request comprises a customized process that includes script customizations by the tenant.

3. The computer-implemented method of claim 1 wherein the at least one resource comprises time allotted for executing instructions associated with the request at a central processing unit of the multi-tenant platform.

4. The computer-implemented method of claim 1 wherein the at least one resource comprises memory space allotted for storing instructions associated with the request in a random-access memory of the multi-tenant platform.

5. The computer-implemented method of claim 1, further comprising:
   receiving a second request at the multi-tenant platform to perform a second operation on behalf of a second tenant of the multi-tenant platform that impacts at least one resource of the multi-tenant platform;
   initiating a second process at the multi-tenant platform isolated from other processes; and
   assigning at least one limitation on usage of the at least one resource by the second process.

6. The computer-implemented method of claim 5, wherein initiating the second process causes a change in the limitation on usage of the at least one resource by the child process.

7. The computer-implemented method of claim 1, further comprising:
   receiving a second request at the multi-tenant platform to perform a second operation on behalf of a second tenant of the multi-tenant platform that impacts at least one resource of the multi-tenant platform;
assigning the second operation to the child process.

8. The computer-implemented method of claim 7, wherein the second operation supplants the operation.

9. The computer-implemented method of claim 1, further comprising:
assigning a limitation on usage of a second resource by a second child process.

10. The computer-implemented method of claim 9, further comprising:
monitoring use of the second resource by the second child process; and
responsive to determining that the monitored use of the second resource exceeds a second threshold, terminating execution of the second child process.

11. A multi-tenant computer platform, comprising:
a central processing unit;
an application programming interface configured to use the central processing unit to receive, using a parent process, a request to perform an operation on behalf of a tenant of the multi-tenant computer platform, the operation having an impact on at least one resource of the multi-tenant computer platform; and
a handler configured to use the central processing unit to:
initiate a child process for the tenant to perform a customization associated with the operation associated with the tenant at the multi-tenant computer platform responsive to analyzing the request to determine the customization;
isolate the child process from other processes associated with other tenants of the multi-tenant platform, wherein the isolating comprises defining a first environment, for the child process, that is isolated from (i) a second environment of a core logic of the multi-tenant platform and (ii) environments of customizations for the other tenants;
assign at least one limitation on usage of the at least one resource of the multi-tenant computer platform by the child process;
control execution of the child process, in the first environment, based on the limitation on usage of the resource, wherein the controlling the execution comprises (i) restricting the child process from accessing at least some data of the second environment and from accessing at least some data of the environments of customizations for the other tenants and (ii) restricting the child process from consuming more than a threshold of the resource defined by the limitation;
monitor use of the at least one resource by the child process; and
responsive to determining that the monitored use exceeds the threshold, assign a further limitation on usage of the resource by the child process.

12. The multi-tenant computer platform of claim 11 wherein the request comprises a customized process that includes script customizations by the tenant.

13. The multi-tenant computer platform of claim 11 wherein the at least one resource comprises time allotted for executing instructions associated with the request at the central processing unit of the multi-tenant platform.

14. The multi-tenant computer platform of claim 11 wherein the at least one resource comprises memory space allotted for storing instructions associated with the request in a random-access memory of the multi-tenant computer platform.

15. The multi-tenant computer platform of claim 11, wherein the handler is further configured to:
receive a second request at the multi-tenant computer platform to perform a second operation on behalf of a second tenant of the multi-tenant platform that impacts at least one resource of the multi-tenant computer platform;
initiate a second process at the multi-tenant computer platform isolated from other processes; and
assign at least one limitation on usage of the at least one resource by the second process.

16. The multi-tenant computer platform of claim 15, wherein the limitation associated with the second process is different than the limitation associated with the child process.

17. The multi-tenant computer platform of claim 11, wherein the handler is further configured to:
receive a second request at the multi-tenant computer platform to perform a second operation on behalf of a second tenant of the multi-tenant computer platform that impacts at least one resource of the multi-tenant platform; and
assign the second operation to the child process.

18. The multi-tenant computer platform of claim 11, wherein the second operation supplants the operation.

19. The multi-tenant computer platform of claim 11, wherein the handler is further configured to:
assign a limitation on usage of a second resource by a second child process;
monitor use of the second resource by the second child process; and
responsive to determining that the monitored use of the second resource exceeds a second threshold, terminate execution of the second child process.

20. A non-transitory computer-readable medium storing computer-executable instructions that when executed by a computer cause the computer to:
receive, using a parent process, a request at a multi-tenant platform to perform an operation on behalf of a tenant of the multi-tenant platform that impacts at least one resource of the multi-tenant platform; and
responsive to analyzing the request to determine a customization associated with the operation associated with the tenant, initiate a child process for the tenant to perform the customization at the multi-tenant platform;
isolate the child process from other processes associated with other tenants of the multi-tenant platform, wherein the isolating comprises defining a first environment, for the child process, that is isolated from at least one of (i) a second environment of a core logic of the multi-tenant platform or (ii) environments of customizations for the other tenants;
assign at least one limitation on usage of the at least one resource by the child process;
control execution of the child process, in the first environment, based on the limitation on usage of the resource, wherein the controlling the execution comprises (i) restricting the child process from at least one of accessing at least some data of the second environment or from accessing at least some data of the environments of customizations for the other tenants and (ii) restricting the child process from consuming more than a threshold of the resource defined by the limitation;
monitor use of the at least one resource by the child process; and responsive to determining that the monitored use exceeds the threshold, assign a further limitation on usage of the resource by the child process.

* * * * *

UNITED STATES PATENT AND TRADEMARK OFFICE
CERTIFICATE OF CORRECTION

PATENT NO. : 10,009,213 B2
APPLICATION NO. : 14/675994
DATED : June 26, 2018
INVENTOR(S) : Wie Michelle Xue and Geoffrey Morrison It is certified that error appears in the above-identified patent and that said Letters Patent is hereby corrected as shown below:

In the Specification

In Column 1, Line 11, delete "May 26, 2014" and insert --May 6, 2014--.

Signed and Sealed this
Eighteenth Day of June, 2019

Andrei Iancu
*Director of the United States Patent and Trademark Office*